Figure 12:
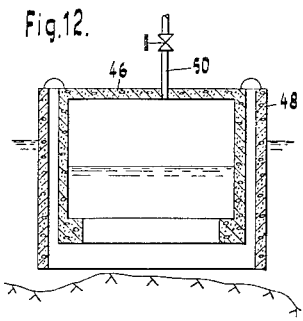
Figure 13:
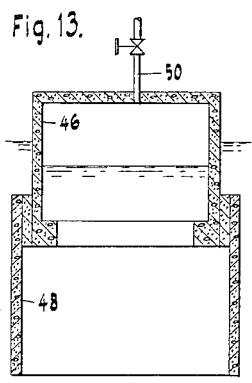

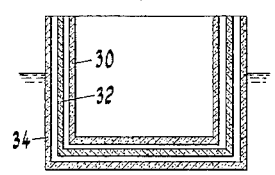
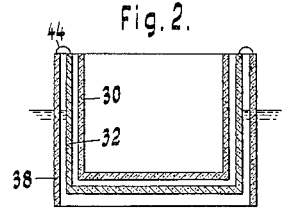
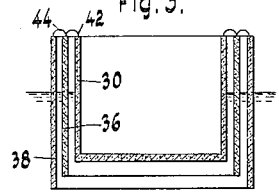
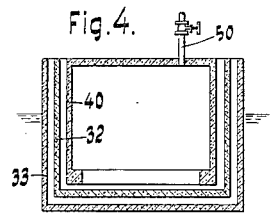
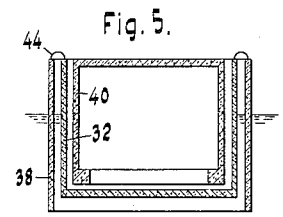
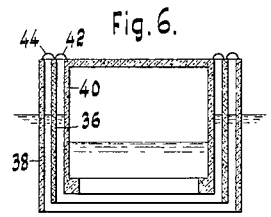
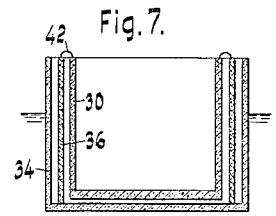
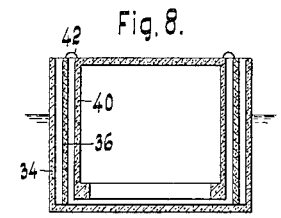
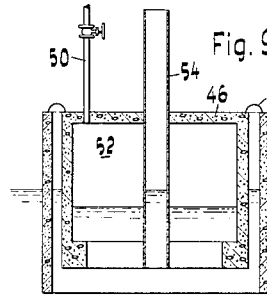
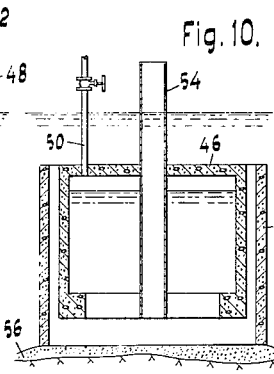
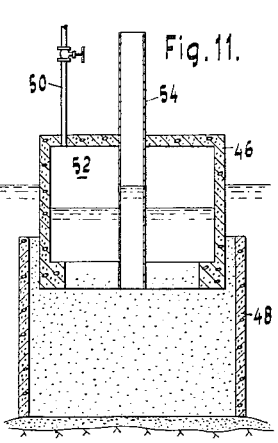

May 28, 1963

R. V. GELLERSTAD 3,091,089

METHOD AND MEANS FOR ERECTING LIGHTHOUSES,
BREAKWATERS, BRIDGE-PIERS AND
SIMILAR STRUCTURES

Filed Aug. 15, 1958

6 Sheets-Sheet 2

May 28, 1963
R. V. GELLERSTAD
3,091,089
METHOD AND MEANS FOR ERECTING LIGHTHOUSES,
BREAKWATERS, BRIDGE-PIERS AND
SIMILAR STRUCTURES
Filed Aug. 15, 1958
6 Sheets-Sheet 3
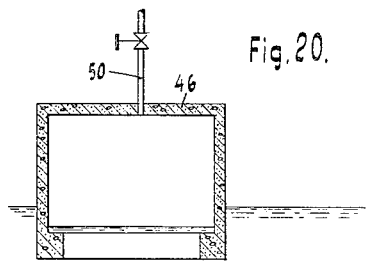
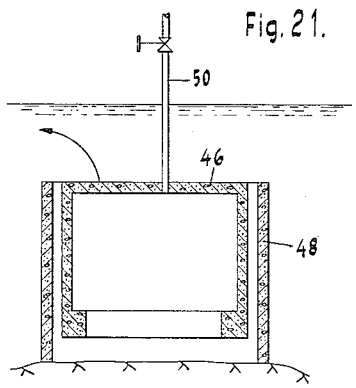
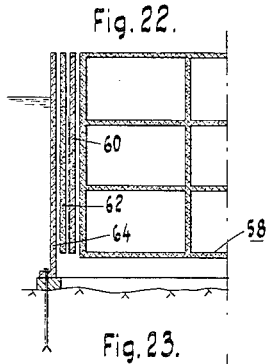
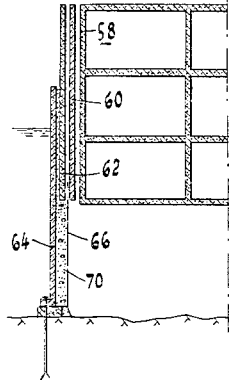
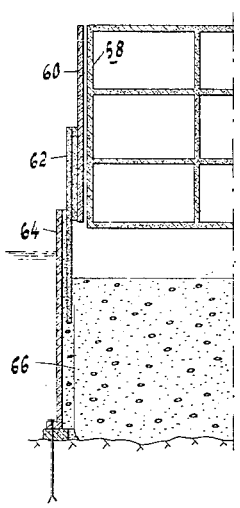
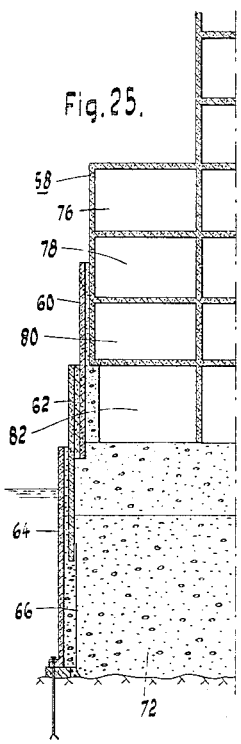

May 28, 1963 R. V. GELLERSTAD 3,091,089
METHOD AND MEANS FOR ERECTING LIGHTHOUSES,
BREAKWATERS, BRIDGE-PIERS AND
SIMILAR STRUCTURES
Filed Aug. 15, 1958 6 Sheets-Sheet 4
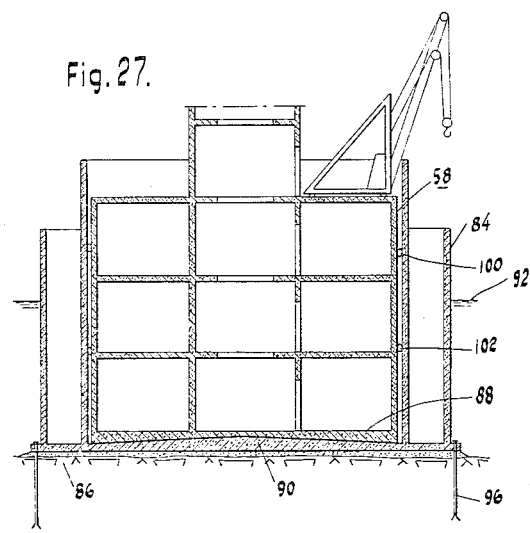
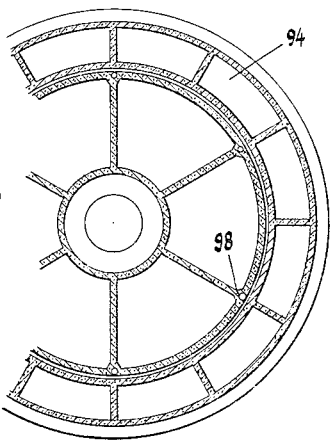
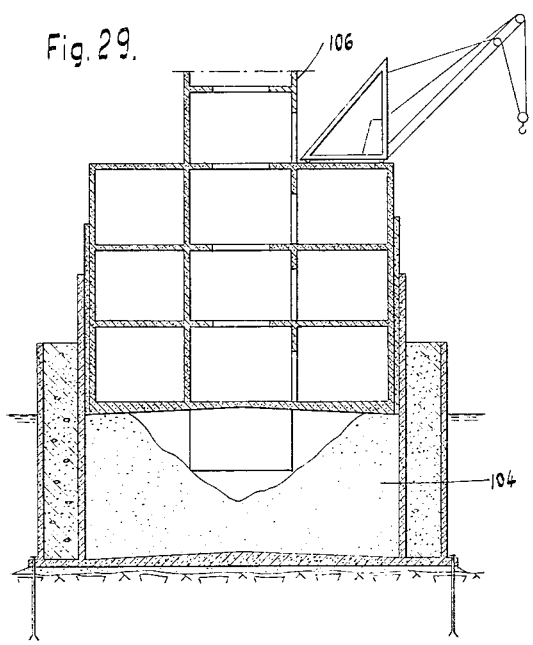
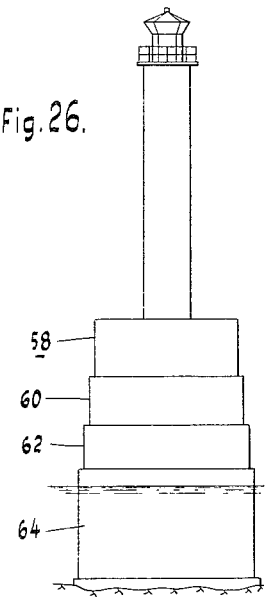

May 28, 1963
R. V. GELLERSTAD
3,091,089
METHOD AND MEANS FOR ERECTING LIGHTHOUSES, BREAKWATERS, BRIDGE-PIERS AND SIMILAR STRUCTURES
Filed Aug. 15, 1958
6 Sheets-Sheet 5
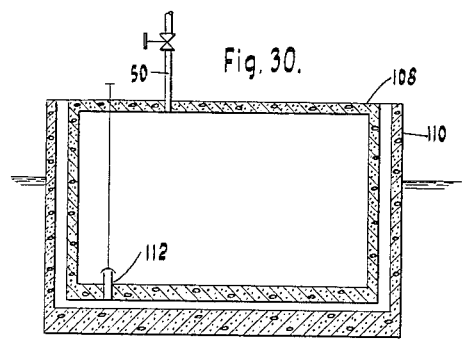
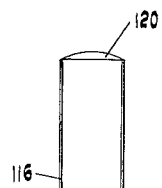
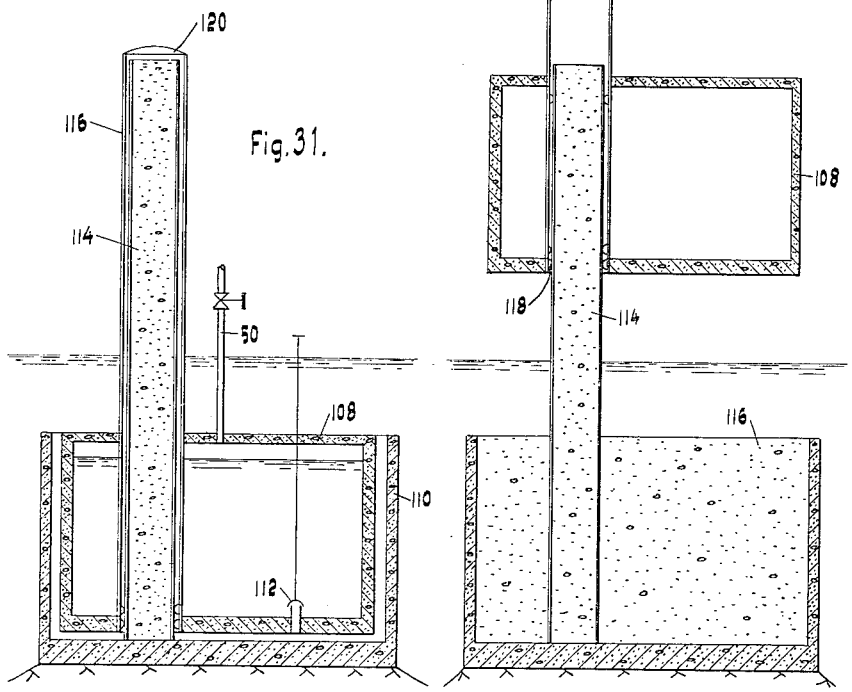

May 28, 1963

R. V. GELLERSTAD 3,091,089

METHOD AND MEANS FOR ERECTING LIGHTHOUSES,
BREAKWATERS, BRIDGE-PIERS AND
SIMILAR STRUCTURES

Filed Aug. 15, 1958

6 Sheets-Sheet 6

United States Patent Office 3,091,089
Patented May 28, 1963

3,091,089
METHOD AND MEANS FOR ERECTING LIGHT-
HOUSES, BREAKWATERS, BRIDGE-PIERS AND
SIMILAR STRUCTURES
Robert Vilhelm Gellerstad, Skyttevagen 45,
Lidingo 1, Sweden
Filed Aug. 15, 1958, Ser. No. 755,344
Claims priority, application Sweden Sept. 17, 1957
3 Claims. (Cl. 61—46)

This invention relates to a method and means for erecting lighthouses, breakwaters, bridge-piers and similar structures to be mounted on the bottom of the sea or river or to be lowered into the bottom or to be supported by any other foundation under water.

A building-work of this type involves great difficulties, especially if the building site is comparatively remote from the shore and at times subjected to powerful heaving of the sea and uncertain meteorological conditions. It is therefore important to reduce as far as possible the effective time for work at the building site, which may be achieved for example by pre-building larger or smaller building-elements ashore so that these elements may be shipped to the building site where they are finally assembled.

Accordingly, a comparatively large caisson has been used in certain cases for erecting a lighthouse. This caisson has been built ashore and then towed to the building site and submerged onto the bottom by filling the caisson with water. Thereafter, one or more stories and the lighthouse tower proper have been built on the caisson in a conventional manner by form building, reinforcing and concrete casting. Such a method of building can obviously also be used for other structures, such as breakwaters, bridge-piers and the like.

Since buildings of this type usually have a relatively great circumference and height so as to become sufficiently heavy and stable, it is not an easy procedure to mount upon the bottom caisson one or more large building sections which would be too difficult to handle by means of conventional methods of building. Further problems arise, of course, if the bottom on which the building is to be erected is at a comparatively great depth.

The object of the invention is considerably to simplify the work which results in a reduction of the time required for work at the building site, safer working conditions and a reduction of the cost for the work.

Principally, the invention comprises the steps of making at least two telescoping main building members mounted in telescopic relation, at least one of said main building members consisting of a caisson or similar floating body having a buoyancy which is preferably sufficiently great to enable the floating member alone to carry the other telescoping main member or members after launching, said members being towed, displaced relative to each other and secured to each other to form the structure desired.

The basic idea according to the invention is thus to employ rational working methods ashore, for instance at a shipyard, for manufacturing the telescoping main members which, when mounted in nested relationship, constitute a comparatively compact unit which can be towed while floating on one of the main members. Within the scope of the invention, the members can be displaced relative to each other and secured to each other in various manners, the mutual displacement being preferably achieved by making use of the buoyancy of the floating member, which can be controlled by supplying or withdrawing water and/or air or some other fluid. Alternatively, the entire structure may be lowered onto a foundation whereupon one or more floating members are used for the intermittent raising of the various main members, or the members may be lowered successively from a member floating on the surface of the water, in which case mechanical lowering devices may be used. By supplying water into one or more floating members or by pumping or forcing water out of the members by means of air under pressure, the buoyancy of the floating member or members and, consequently, their level in the water can be controlled with relatively high accuracy and in a simple manner.

The above named and further objects and advantages of the invention will be described hereinafter with reference to the accompanying drawings which illustrate several embodiments of structures according to the invention.

FIGS. 1 to 8 are diagrammatic sectional views of different combinations of three telescoping main members according to the invention. FIGS. 9 to 21 are diagrammatic sectional views of a combination of two main members which may be towed and assembled in different manners as illustrated. FIGS. 22 to 26 illustrate the consecutive steps when erecting a lighthouse according to the invention. FIGS. 27 to 29 show another application of the invention for erecting another embodiment of a lighthouse according to the invention. FIGS. 30 to 32 show a combination of two main members one of which can be lifted above the water level and secured to one or more columns, and FIGS. 33 to 36 show another combination of two caissons.

In all of the embodiments illustrated the main members are assumed to be cylindrical, but it will be understood that they may be oval, rectangular or polygonal or may have any other required contour. These members may consist of concrete or any other suitable material. The floating members usually consist of water-tight boxes or so-called caissons which can float with their open ends turned either upwards or downwards.

FIGS. 1 to 8 illustrate an inner caisson 30, an intermediate caisson 32, an outer caisson 34, an intermediate telescopic member in the form of a cylinder 36, an outer cylindrical telescopic member 38 and an inverted inner caisson 40. Reference numeral 42 denotes means for detachably coupling together an inner member and an intermediate member, and numeral 44 denotes corresponding coupling means between an intermediate member and an outer member, said means being indicated merely diagrammatically for the purpose of illustration.

The telescopic members according to FIGS. 1 to 3 and 7 are preferably used in cases where the depth of the foundation or bottom is so small that the upper ends of the telescopic members after the lowering operation still remain above the surface of the water, whereas the combinations according to FIGS. 5, 6 and 8 advantageously may be entirely submerged in the water.

The members are lifted relative to each other by the buoyancy of the caissons, which can be very accurately controlled by the supply or removal of water or the like.

After the combination shown in FIG. 1 has been placed onto the bottom, water is pumped into the space between the outer caisson 34 and the intermediate caisson 32. As a result thereof, the intermediate caisson will rise up to a certain level together with the inner caisson. If required, the intermediate caisson can be further raised by means of mechanical, hydraulical or pneumatical lifting devices, such as so-called hydraulic jacks used for slide form casting, said jacks also acting during the hydrostatic lifting to guide the telescoping members relative to each other. When the intermediate caisson has arrived at the desired level, it is fastened to the outer caisson, preferably by casting. In the next step, the space between the inner caisson 30 and the intermediate caisson 32 is filled with water to raise the inner caisson which is then secured to the intermediate caisson in the same way. The same method of operation may be applied in the combination shown in FIG. 4 except for the fact that the inner caisson is raised by the supply of air through pipe 50.

In the combinations according to FIGS. 2, 3, 5 and 6, the clearance between the lower edge of the outer cylinder 38 and the foundation is sealed before water is pumped into this cylinder. If the intermediate member consists of a caisson, as shown in FIGS. 2 and 5, this caisson is then allowed to rise after the coupling means 44 have been released. Then the intermediate caisson 32 is secured to the outer cylinder 38 whereupon the inner caisson 30 or 40 is raised in the manner described. The inverted inner caisson 40 is raised by supplying air under pressure into its cavity. In FIGS. 3, 6, 7 and 8, the intermediate cylinder 36 is raised during the first step together with the inner caisson 30 or 40 and secured to the outer cylinder 38 or outer caisson 34 after the coupling means 44 have been released. The final step comprises releasing of the coupling means 42 and raising of the inner caisson in the manner described.

In FIGS. 9 to 21, reference numeral 46 denotes an inverted caisson which is surrounded by a telescopically displaceable main member in the form of an outer cylinder 48. A pipe 50 communicates with the air space 52 of the caisson for the supply of air under pressure from a source not shown and for venting said air space. A filler pipe 54 may extend downward through the bottom of the inverted caisson for the supply of a filling-material, such as gravel, macadam, shingle or the like, in order to fill up the cavity and stabilize the structure.

Figure 17:
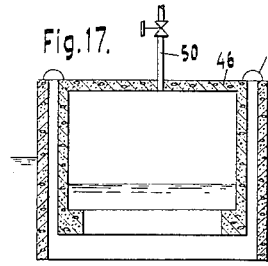
Figure 18:
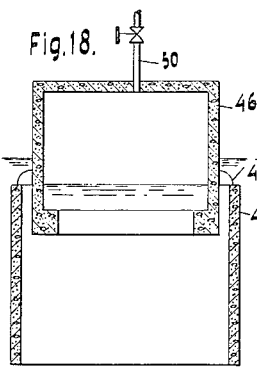
Figure 19:
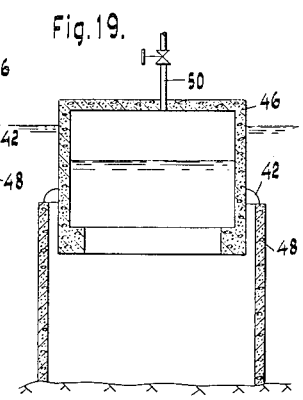

Although FIGS. 9, 12 and 17 are similar, they illustrate starting positions for different series of steps during transportation to, and mounting of the structure on, the building site.

In FIG. 10, both members 46 and 48 are entirely submerged. The cylinder 48 may be anchored to the bottom 56, and the clearance between the cylinder and the bottom is sealed. When air under pressure is pumped into the space 52, the caisson 46 will rise to the position shown in FIG. 11 in which it is connected to the cylinder 48.

Figure 14:
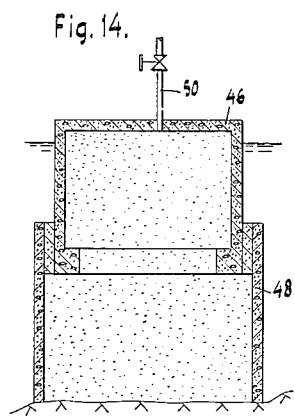

FIG. 12 shows the compound structure placed in shallow water, for instance in a harbour. After the structure has been towed out to deep water, the cylinder 48 can be lowered and fastened to the caisson in the position shown in FIG. 13. The unit thus finally assembled can then be towed to the building site and lowered as shown in FIG. 14.

Figure 15:
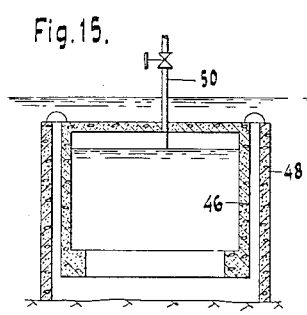
Figure 16:
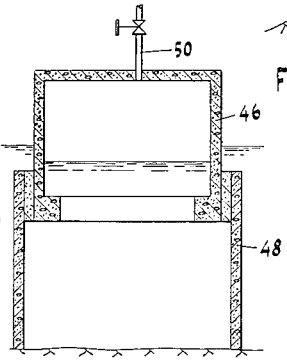

Another alternative method of making a unit to be towed is illustrated in FIGS. 15 and 16. In FIG. 15, the compound structure 46, 48 is placed under water on a temporary foundation. The cylinder 48 may be provisionally anchored to the foundation. Prior to the towing operation, the caisson is raised by blowing air under pressure into its cavity and is then fastened to the cylinder, FIG. 16. Thereupon the anchoring members of the cylinder are released so as to enable the assembled unit to rise from the foundation and to be towed to the building site where the unit is lowered in the manner indicated above. Under certain conditions, it may be advantageous to tow an assembled unit according to FIGS. 13 and 18. Among other things, the floating member formed by the unit is more stable against tilting during the towing operation than a structure of the kind shown in FIG. 9. The main advantage, however, is the possibility of manufacturing and towing, in shallow water, the members intended to be placed as a unit in deep water.

FIGS. 17 to 20 illustrate consecutive steps during the transportation of the caisson and the cylinder, namely, placing the structure in shallow water, lowering the cylinder and connecting same to the caisson to form a unit for towing, lowering the unit to the bottom, and detaching the caisson from the cylinder (FIG. 20) to leave the cylinder behind if required, for instance to form a submarine breakwater. FIG. 21 illustrates another method of leaving the cylinder 48 behind. In this instance, both members are lowered to the bottom whereupon the caisson is caused to rise up out of the cylinder.

The above described combinations may be further varied within the scope of the invention both as to the arrangement and number of members.

In the following, two practical applications of the invention will be described in connection with the building of lighthouses.

The lighthouse according to FIGS. 22 to 26 is composed of four telescoping main members, namely, an inner caisson 58, two intermediate cylinders 60 and 62, and an outer cylinder 64. The inner caisson 58 is constructed to hold dwelling rooms, machine rooms etc., as indicated by the division of the caisson into compartments, and may be termed a dwelling caisson. Prior to the towing to the building site, this dwelling caisson is finished as far as possible with respect to building work, furniture and fittings.

The arrangement of the telescoping members corresponds to the general combination according to FIG. 3 except for the addition of a further cylinder.

After the structure has been towed to the ground and lowered on the ground as shown in FIG. 22, the outer cylinder 64 is cast to the ground and sealed along its bottom edge. In the first lifting step which is carried out in the manner described above by the pumping of water into the outer cylinder 64, the caisson rises into the position shown in FIG. 23 in which the outer intermediate cylinder 62 is secured by casting to the inside of the outer cylinder 64. Between the cylinders 60, 62 there is provided a slidable sheet-metal cylinder 66 which is lowered after the first lifting step and forms a shuttering so that a concrete wall 70 of prepacted shingle or macadam can be made below the cylinder 62. At the same time, shingle, macadam, gravel or other filling-material is filled into the space below the dwelling caisson, for instance by means of one or more supply pipes 54 (FIG. 9) which in the present case extend through the bottom of the dwelling caisson. FIG. 24 illustrates the members in the position after the second lifting step, and FIG. 25 after the third and last lifting step. In the embodiment exemplified, the entire space below the caisson is then filled with pebbles 72 which are injected with cement mortar according to the "Prepakt" method in known manner. The tower 74 proper is then built preferably by means of a hydraulic moving-form.

FIG. 25 illustrates the division of the spaces into dwellings 76, 78, storerooms 80 and machine rooms 82.

The lighthouse illustrated in FIGS. 27 to 29 is built in accordance with the principle illustrated in FIG. 1 except for the fact that two caissons only are used in the present instance.

The inner caisson 58 is again constituted by a so-called dwelling caisson for the above named purposes and is surrounded by a double-walled bottom caisson 84.

In FIG. 27, the caissons are mounted slid into each other and lowered onto a levelled ground 86. The caissons are centered relative to each other due to the fact that the lower side of the bottom 88 of the inner caisson is concave, while the upper side of the bottom 90 of the outer caisson is correspondingly convex. The level of the surrounding water is indicated at 92. As shown in FIGS. 27 and 28, the outer caisson has circumferential compartments 94. By filling these compartments with water, the caissons are lowered to the position shown in FIG. 27. If the ground consists of rock, the caissons are anchored by means of bolts 96. At the same time the compartments 94 are filled with macadam which is injected with mortar by the "Prepakt" method in known manner. Also the macadam bed below the bottom of the outer caisson is prepacted.

Thereupon the inner caisson is lifted by the supply of water into the clearance between the caissons, and simultaneously macadam is supplied through said clearance. One or more pipes 54 according to FIG. 9 may extend through the bottom 88 of the inner caisson to facilitate the filling with macadam. The raising movement of the inner caisson may be guided and controlled by means of a number of hydraulic jacks of the type used for moving-forms or in another suitable manner. In each corner of the compartments of the inner caisson there may be provided a vertical pipe 98 which extends downward throughout the entire inner caisson. In this pipe there is arranged a climbing-rod which rests on the bottom of the outer caisson. At the top end of the pipe 98 there is provided in known manner an intermittently working lifting device which while lifting the inner caisson can be caused to ascend along said climbing-rod. Between the caissons there may also be provided buoyant balls 100 and/or floating or suspended balls 102 which constitute bearing members between the caissons.

During the last phase of the raising of the inner caisson to the position shown in FIG. 29, water is pumped into the caisson to a level above the level of the sea. The hydraulic lifting devices perform the last part of the raising operation. The dwelling caisson is then adjusted to an exactly horizontal position and connected to drain and salt-water pipes, and further the caissons are secured to each other by casting. The macadam filling 104 below the inner caisson is completed and prepacted. The lighthouse tower proper is then built upon the central part 106 by slide form moulding.

In cases where two or more caissons slid into each other are used to form a tower for submarine drilling, it is suitable to provide an inner vertical tube which opens through the bottom of the outer caisson. Around this inner tube there is arranged a telescoping tube which is secured to the bottom of the nearest inner caisson so that upon mutual displacement of the caissons said inner tube and outer telescoping tubes also will be displaced relative to each other to form a vertical passage through which a bore spindle or the like may be introduced.

FIGS. 30 to 32 finally illustrate a combination comprising an entirely closed inner caisson 108 placed within an outer caisson 110. Air under pressure can be supplied into the inner caisson through conduit 50, and water can be supplied or forced out through a bottom valve 112.

One or more vertical columns 114, merely one of which being shown in the drawing, are secured to the bottom of the outer caisson and surrounded by an outer pipe 116 secured to the bottom of the inner caisson such that the column 114 is displaceable relative to the pipe 116.

To raise the inner caisson, air is pumped into the cavity of the caisson to force water out of the caisson through the valve 112, resulting in that the inner caisson will rise up to and above the surface of the water. Then the inner caisson is filled with macadam which is prepacted, in order to stabilize the column or columns 114. The free end of each column forms a plunger in the pipe 116 which has packing means 118 at its lower end.

The top end 120 of the pipe is closed so that the pipe acts as a cylinder. Water or other fluid under pressure can be pumped into this cylinder or cylinders to raise the pipe or pipes 116 and the inner caisson carried thereby to the position shown in FIG. 32 in which the caisson is secured to the column or columns. In this construction, the caisson raised above the surface of the water may be used as a keeper's room of a lighthouse, a support in a bridge structure or for any other desired purpose. The problem of raising the caisson above the surface of the water is solved by the method according to the invention in a very simple manner.

Figure 33:
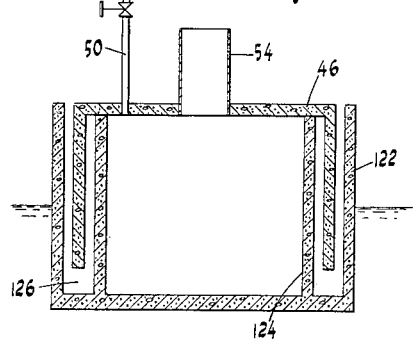

FIGS. 33 to 36 exemplify a method of building a breakwater element which consists of an inverted caisson 46 and a caisson 122 which is open at the top. The last mentioned caisson has an inner wall 124 which together with the outer wall of the caisson forms an annular hollow space 126 into which the wall of the caisson 46 is lowered, as shown in FIG. 33.

Figure 34:
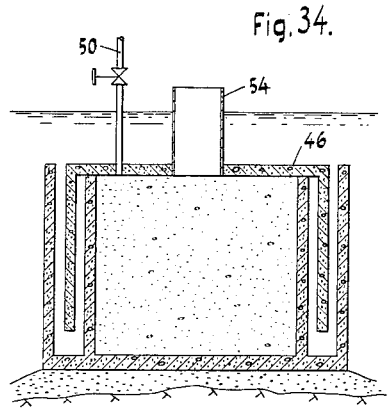
Figure 35:
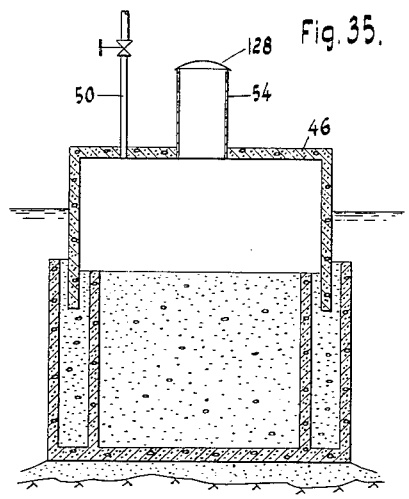
Figure 36:
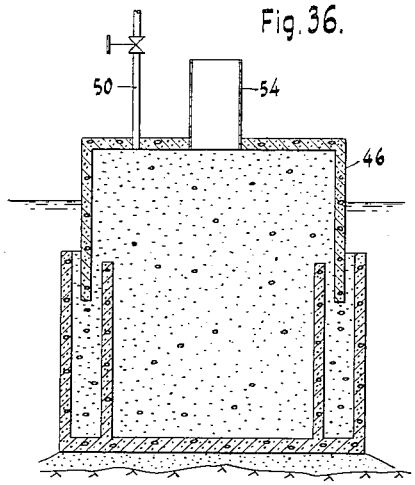

The compound structure is submerged onto the ground according to FIG. 34, and filling-material is supplied through the pipe 54 to entirely fill up the inner cavity of the caisson 122. Then the upper end of the pipe 54 is closed by a cover 128 and air under pressure is pumped into the cavity through the conduit 50. As a result, the caisson 46 will be raised to the position shown in FIG. 35 whereupon the annular space 126 is filled with filling-material and the caisson 46 is secured by casting in the desired position. Then the caisson 46 is also entirely filled with filling-material, as shown in FIG. 36. This embodiment of the invention is suitable in cases where the work is to be carried out at sea where it is important to obtain monoliths rapidly increasing in weight. This is possible by the arrangement now described in which the weight of the structure can be increased while the waves roll over the structure.

What is claimed is:

1. The method of building lighthouses and similar structures of substantially vertical cylindrical form which comprises the steps of telescopically assembling a plurality of cylindrical elements of said structure at least one of which cylindrical elements is a buoyant caisson having sufficient buoyancy to float the resulting assembly, floating the assembly in a telescopically contracted state in water to a desired position above a water bed, lowering the entire telescopically-contracted assembly into engagement with the water bed by at least partially reducing the buoyancy of said caisson, vertically expanding the telescopic assembly with the lowermost telescopic element in contiguous engagement with the water bed, rigidly connecting at least the lowermost two telescopically arranged elements and removing said buoyant caisson element from the assembly.

2. Apparatus for building lighthouses and the like of substantially vertical cylindrical form comprising an assembly of a plurality of vertical telescopically arranged cylindrical elements, at least one of said elements being a buoyant caisson having sufficient buoyancy to float said assembly, means for reducing the buoyancy of said caisson to lower said assembly in a contracted state upon a water bed, means for vertically expanding said telescopic assembly with the lowermost extremity of the outermost cylindrical element in engagement with said water bed, conduit means for introducing a heavy filling aggregate within the lowermost cylindrical element when said assembly is in its expanded state, said outermost telescopic element being closed at its lower end and the innermost telescopic element being closed at its upper end, at least one vertical pipe extending upwardly from the closed upper end of said innermost element and in communication with the interior thereof, said pipe being closed at its upper end, a vertical column secured at its lower end to the closed end of said outermost element and extending upwardly in said vertical pipe, and means for introducing fluid under pressure within said vertical pipe to raise the innermost telescopic element relative to the outermost telescopic element.

3. Apparatus as defined in claim 2, and means for admitting a gas into said innermost telescopic element to raise each of the other telescopic elements in the assembly successively into expanded relation to its externally adjacent element.

References Cited in the file of this patent

UNITED STATES PATENTS

| | | |
|---|---|---|
| 891,966 | Tromanhauser | June 30, 1908 |
| 1,907,943 | Fitzpatrick | May 9, 1933 |
| 2,050,727 | Misz | Aug. 11, 1936 |
| 2,470,312 | Levin | May 17, 1949 |
| 2,667,038 | Bayley | Jan. 26, 1954 |
| 2,756,021 | Townsend et al. | July 24, 1956 |
| 2,960,833 | Hayward | Nov. 22, 1960 |

FOREIGN PATENTS

| | | |
|---|---|---|
| 779,516 | France | Jan. 14, 1935 |
| 609,289 | Germany | Feb. 12, 1935 |
| 983,420 | France | Feb. 14, 1951 |
| 903,440 | Germany | Feb. 4, 1954 |